United States Patent
George

(10) Patent No.: US 6,568,486 B1
(45) Date of Patent: May 27, 2003

(54) MULTIPOLE ACOUSTIC LOGGING WITH AZIMUTHAL SPATIAL TRANSFORM FILTERING

(75) Inventor: Wallace R. A. George, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 270 days.

(21) Appl. No.: 09/656,143

(22) Filed: Sep. 6, 2000

(51) Int. Cl.[7] .................................................. F21B 7/00
(52) U.S. Cl. ............................................ 175/45; 702/6
(58) Field of Search ...................... 702/6, 14; 181/104; 367/25, 153; 175/45; 327/277; 600/443; 703/5, 10

(56) References Cited

U.S. PATENT DOCUMENTS

| | | | |
|---|---|---|---|
| 3,593,255 A | 7/1971 | White | 340/15.5 SW |
| 4,207,961 A | 6/1980 | Kitsunesaki | 181/106 |
| 4,369,506 A | 1/1983 | Benzing | 367/31 |
| 4,383,591 A | 5/1983 | Ogura | 181/106 |
| 4,446,544 A | 5/1984 | Connolly, Jr. | 367/155 |
| 4,516,228 A | 5/1985 | Zemanek, Jr. | 367/75 |
| 4,542,487 A | 9/1985 | Benzing et al. | 367/31 |
| 4,606,014 A | 8/1986 | Winbow et al. | 367/75 |
| 4,649,525 A | 3/1987 | Angona et al. | 367/31 |
| 4,774,693 A | 9/1988 | Winbow et al. | 367/27 |
| 4,782,910 A | 11/1988 | Sims | 181/106 |
| 4,832,148 A | 5/1989 | Becker et al. | 181/104 |

(List continued on next page.)

FOREIGN PATENT DOCUMENTS

| | | | | |
|---|---|---|---|---|
| EP | 0031989 A1 | 7/1981 | | G01V/1/40 |
| GB | 2122351 | 1/1984 | | G01V/1/40 |
| GB | 2124377 | 2/1984 | | G01V/1/40 |
| GB | 2130725 | 6/1984 | | G01V/1/40 |
| GB | 2132763 | 7/1984 | | G01V/1/40 |

OTHER PUBLICATIONS

Harrison, A. R. et al. *Acquisition and Analysis of Sonic Waveforms From a Borehole Monopole and Dipole Source for the Determination of Compressional and Shear Speeds and Their Relation to Rock Mechanical Properties and Surface Seismic Data. SPE 20557.* Presented at 65th Annual Tech. Conf. and Exh. of the SPE in New Orleans, LA (Sep. 23–26, 1990) pp. 267–282.

Kitsunezaki, Choro. *A New Method for Shear–Wave Logging. Geophysics.* vol. 45, No. 10 (Oct. 1980) pp. 1489–1506.

Kurkjian, Andrew L. and Chang, Shu–Kong. *Acoustic Multipole Sources in Fluid–Filled Boreholes. Geophysics.* vol. 51, No. 1 (Jan. 1986) pp. 148–163.

Zemanek, J. et al. *Shear–Wave Logging Using Multipole Sources. The Log Analyst* (May–Jun. 1991) pp. 233–241.

Primary Examiner—Edward Lefkowitz
Assistant Examiner—Victor J. Taylor
(74) Attorney, Agent, or Firm—John L. Lee; William B. Batzer; John J. Ryberg

(57) ABSTRACT

A method and apparatus are provided for detecting a received acoustic pulse of a selected azimuthal borehole mode in a liquid-containing borehole in a formation. The method uses a sonde having an axial array of acoustic receiver stations aligned with the borehole, each receiver station having an azimuthal array of at least four piezoelectric receiver elements, the receiver elements uniformly spaced apart around the azimuthal array. An acoustic pulse transmitted within the borehole produces an electrical signal at each receiver element. Azimuthal spatial transform filtering is applied to produce data representing a received acoustic pulse of the selected azimuthal borehole mode. In one embodiment, azimuthal spatial DFT filtering is applied to digital data produced by analog to digital conversion. In another embodiment, cosine transform filtering is applied by an apodized receiver element.

12 Claims, 8 Drawing Sheets

U.S. PATENT DOCUMENTS

| | | |
|---|---|---|
| 4,855,963 A | 8/1989 | Winbow et al. ............... 367/31 |
| 4,932,003 A | 6/1990 | Winbow et al. ............... 367/75 |
| 4,951,267 A | 8/1990 | Chang et al. .................. 367/31 |
| 5,343,001 A | 8/1994 | Cowles et al. .............. 181/102 |
| 5,357,481 A | 10/1994 | Lester et al. ................... 367/31 |
| 5,640,371 A * | 6/1997 | Schmidt et al. ............. 367/153 |
| 5,678,643 A * | 10/1997 | Robbins et al. ................ 175/45 |
| 5,808,963 A | 9/1998 | Esmersoy .................... 367/31 |
| 5,831,934 A * | 11/1998 | Gill et al. ...................... 367/25 |
| 6,208,189 B1 * | 3/2001 | Freeman et al. ............ 327/277 |
| 6,312,384 B1 * | 11/2001 | Chiao ......................... 600/443 |

\* cited by examiner

MULTIPOLE ACOUSTIC LOGGING WITH AZIMUTHAL SPATIAL TRANSFORM FILTERING

TECHNICAL FIELD

The present invention relates to apparatus and methods for acoustic logging in earth formation around a borehole.

BACKGROUND OF THE INVENTION

An important parameter to be determined in logging an oilfield earth formation around a borehole is the velocity (or its inverse: "slowness") of acoustic propagation in the formation. Determining velocity or slowness effectively involves measuring the time taken by an acoustic signal to travel a known distance in the formation at the borehole wall, typically using an acoustic transmitter and a plurality of acoustic receivers. To minimize the effects of spurious signals, the transmitter is typically excited by periodic pulses.

Acoustic logging of velocity in an earth formation can be performed in a previously drilled borehole or while drilling the borehole. Conventional logging in a previously drilled borehole is known as "wireline logging". In wireline logging, an acoustic logging tool is lowered into and then pulled out of, a previously drilled borehole, on an armored "wireline" communication cable. Conventional logging while drilling the borehole is known as "logging while drilling" ("LWD"). In LWD an acoustic logging tool is attached to a thick steel mandrill close behind the drill bit.

Conventional acoustic tools used in wireline logging or LWD typically include one transducer configured as a transmitter to generate and transmit an acoustic signal, and a plurality of transducers, configured as an array of receivers, that detect the acoustic signal in the borehole. These transducers can be made of piezoelectric ceramic materials which, when used as transmitters, expand and contract transversely to their surfaces (i.e., change in thickness) in response to electrical excitation, or conversely, when used as receivers, generate electrical voltages between those surfaces when subjected to pressure fluctuations. In the case of transmitters, they can also be electrodynamic. That is, an electrodynamic assembly can drive their transducing operation in a manner that is, in principle, similar to the electrodynamic assemblies used in loudspeakers in many radios and stereo systems. Thus, the transmitter can be driven with an appropriate oscillating electrical signal to generate pressure fluctuations in the liquid in the borehole.

These pressure fluctuations travel ("propagate") as acoustic signals through the liquid and into and through the surrounding formation. Some of the acoustic signals propagating through the formation couple back into the borehole liquid to produce electrical voltage signals at the outputs of the receivers. These voltage signals are sensed, amplified, and processed downhole to extract information for transmission up the cable. Alternatively, the waveforms of the voltage signals can be transmitted uphole, for example as digitized time samples, for processing at the surface.

The type of transmitter most commonly used, a cylinder, generates compressional pressure waves ("P waves") in the borehole liquid. However, acoustic logging tools are not limited to investigating the propagation of P waves. When the P wave reaches the borehole wall, some of the acoustic energy is typically converted into other modes of acoustic propagation. Thus, both P waves and shear waves ("S waves") can be excited in the formation. The P waves can also excite guided borehole modes in the borehole. Guided borehole modes include the monopole Stoneley mode (the lowest radial order monopole borehole mode), the dipole flexural mode (the lowest radial order dipole borehole mode), and the quadrupole screw mode (the lowest radial order quadrupole borehole mode). They can also excite sextupole (also called hexapole) and other higher azimuthal order borehole modes. The P waves can also excite higher radial order monopole, dipole, and quadrupole modes in the borehole. The relative level of excitation for each of the modes depends on such factors as the transmitter type, the formation type, the borehole size, the frequency range, and how well centered the transmitter and/or the tool is, amongst other factors. Because these different modes generally travel at different speeds, they can sometimes be distinguished in the receiver signals. Determination of such parameters as the speed and attenuation of P,S, Stoneley, and flexural waves is useful in investigating a variety of subsurface formation properties of interest in the exploration for hydrocarbons and other valuable raw materials.

Prior art sonic borehole logging tools typically use the monopole and dipole formation and lowest radial order borehole modes (Stoneley and flexural) for acoustic logging. Prior art sonic borehole logging tools that use the dipole mode typically measure the sound field downhole in a borehole using an axial array of dipole receivers. Such tools are discussed in U.S. Pat. No. 4,951,267 (the Chang patent), U.S. Pat. Nos. 3,593,255, 4,446,544, and 5,343,001. If too many types of borehole modes and/or formation waves are significantly present in the pressure signals sensed at the receivers, then identifying specific acoustic pulses in the receiver signals and selecting the desired pulse becomes difficult. Thus, a major challenge in the design of acoustic logging tools that use the dipole mode, is to significantly improve the rejection of monopole and other non-dipole azimuthal (multipole) mode contamination that can be simultaneously generated and propagated in the borehole. A similar challenge is presented in the design of acoustic logging tools that use the quadrupole mode, or the sextupole mode, or any other multipole mode.

Differentiation between monopole and dipole in acoustic logging in a borehole is typically accomplished in the prior art by using a receiver having an "azimuthal array" which has only two receiver elements that face each other.

The prior art includes various kinds of multipole or azimuthally asymmetric transducers suspended in the borehole liquid for direct or indirect shear wave logging. The prior art includes dipole transducers as disclosed in U.S. Pat. Nos. 3,593,255; 4,207,961; 4,383,591; and 4,516,228, and GB patent specifications 2,124,377 and 0,031,989. It further includes quadrupole transducers as disclosed in GB patent specifications 2,122,351 and 2,132,763. It further includes octapole transducers as disclosed in GB patent specification U.S. Pat. No. 2,130,725. U.S. Pat. No. 4,369,506 discloses the use of geophones suspended in the liquid in a borehole, the geophones buoyancy-adjusted to be nearly neutral to encourage sympathetic movement with the borehole wall. U.S. Pat. No. 4,542,487 discloses buoyancy-adjusted geophones in orthogonally mounted pairs. These buoyancy adjustments are difficult to make accurately and significantly complicate the use of such devices.

Another type of dipole receiver, a "bender", includes a pair of oppositely polarized piezoelectric plates securely joined together. Such receivers are described in U.S. Pat. Nos. 4,516,228; 4,606,014; 4,649,525; 4,774,693; 4,782,910 and 5,357,481.

Transmitters for producing quadrupole and sextupole (hexapole) modes in a borehole are described in U.S. Pat.

Nos. 4,855,963 and 4,932,003. These transmitters include a thin-walled, radially poled, piezoelectric cylinder divided electrically into an even number of closely matched segments.

SUMMARY OF THE INVENTION

The invention provides a method for detecting a received acoustic pulse of a selected azimuthal borehole mode in a liquid-containing borehole in a formation. The method uses a sonde having an axial array of acoustic receiver stations aligned with the borehole, each receiver station having an azimuthal array of at least four piezoelectric receiver elements, the receiver elements uniformly spaced apart around the azimuthal array. An acoustic pulse transmitted into the formation produces an electrical signal at each receiver element. Azimuthal spatial filtering is applied to a representation of the pulse after the pulse has passed through the formation to produce data representing pressure associated with the selected azimuthal borehole mode. The number of the at least four piezoelectric receiver elements in a receiver station is at least equal to, and is generally greater than, the minimum number of azimuthally arrayed receiver elements required to resolve pulses of the selected mode without aliasing.

In a first preferred embodiment of the method, analog to digital conversion is performed on an electrical signal from a receiver element to produce element data representing the electrical signal. This is repeated for other receiver elements in the azimuthal array to produce element data for each of the other receiver elements. Azimuthal spatial DFT filtering is applied, according to the selected mode, to element data of a receiver station to produce receiver station data for that receiver station. This is repeated for each receiver station of the axial array. Then, using receiver station data, a received acoustic pulse of the selected azimuthal borehole mode is detected.

In a second preferred embodiment of the method, electrical signals from apodized receiver elements are combined to produce element data representing a cosine transform of the pressure associated with the receiver station.

Electrical signals from apodized receiver segments are appropriately summed together to produce data associated with cosine apodized receiver elements. For the dipole case, element data is combined by differencing signals from pairs of apodized receiver elements. For the general multipole case, element data is combined by summing signals from every other receiver element. Signals resulting from the resulting pair of receiver element groups are then differenced. These steps are repeated for each receiver station of the axial array to yield a set of receiver station electrical signals. The set of receiver station electrical signals is processed to produce data representing the received acoustic pulse of the selected azimuthal borehole mode.

The invention provides an apparatus for detecting a received acoustic pulse of a selected azimuthal borehole mode in a liquid-containing borehole. The apparatus includes a sonde having an axial array of acoustic receiver stations aligned with the borehole, each receiver station having an azimuthal array of piezoelectric receiver elements. It also includes a transmitter for transmitting an acoustic pulse into the formation, and a data processor, wherein at least either the data processor or the axial array includes means for applying azimuthal discrete spatial transform filtering. Each receiver station includes an azimuthal array of at least four piezoelectric receiver elements. The receiver elements are uniformly spaced apart around the azimuthal array. In a first preferred embodiment of the apparatus, the data processor includes software for applying azimuthal spatial discrete Fourier transform filtering digitally. In a second preferred embodiment of the apparatus, the axial array of acoustic receiver stations includes apodized receiver elements.

DETAILED DESCRIPTION

General

The present invention uses anti-aliasing azimuthal spatial filtering in acoustic logging in a liquid-containing borehole in a formation to detect a received acoustic pulse of a selected azimuthal borehole mode in the borehole. The filtering selectively accepts signals representing the desired azimuthal mode, and selectively rejects signals that can be generated and propagated in the borehole in other azimuthal modes, thereby achieving a higher signal to noise ratio than is currently available using prior art techniques. A first preferred embodiment of the method of the invention, illustrated in FIG. 1, uses full azimuthal spatial Discrete Fourier Transform filtering ("DFT filtering") implemented digitally. A second preferred embodiment of the method of the invention, illustrated in FIG. 2, uses azimuthal spatial cosine transform filtering ("CT filtering"), applied by sinusoidally apodized shaped receiver elements. The apodized receiver elements are cosine shaped for the dipole borehole mode, double cosine for the quadrupole, and triple cosine for the sextupole, etc.

In both preferred embodiments, the selected mode is dipole mode. However, multipole versions are also proposed herein. The selected mode can be quadrupole, sextupole, or a higher mode by using equivalent methods to those described above, and by using DFT techniques for DFT embodiments, and by using double and triple, etc., sinusoid apodizations for apodized embodiments.

In all embodiments, filtering is provided to selectively tune in a selected azimuthal mode, and to reduce the unwanted effects of aliasing. Although the invention is primarily directed to improving the reception of acoustic signals in a borehole by reducing the unwanted effects of aliasing, the invention also reduces some of the unwanted effects of receiver mismatch, noise, and receiver eccentricity.

Stacked-Ring Array Receiver Stations for Wireline Logging

Figures 3, 3A:
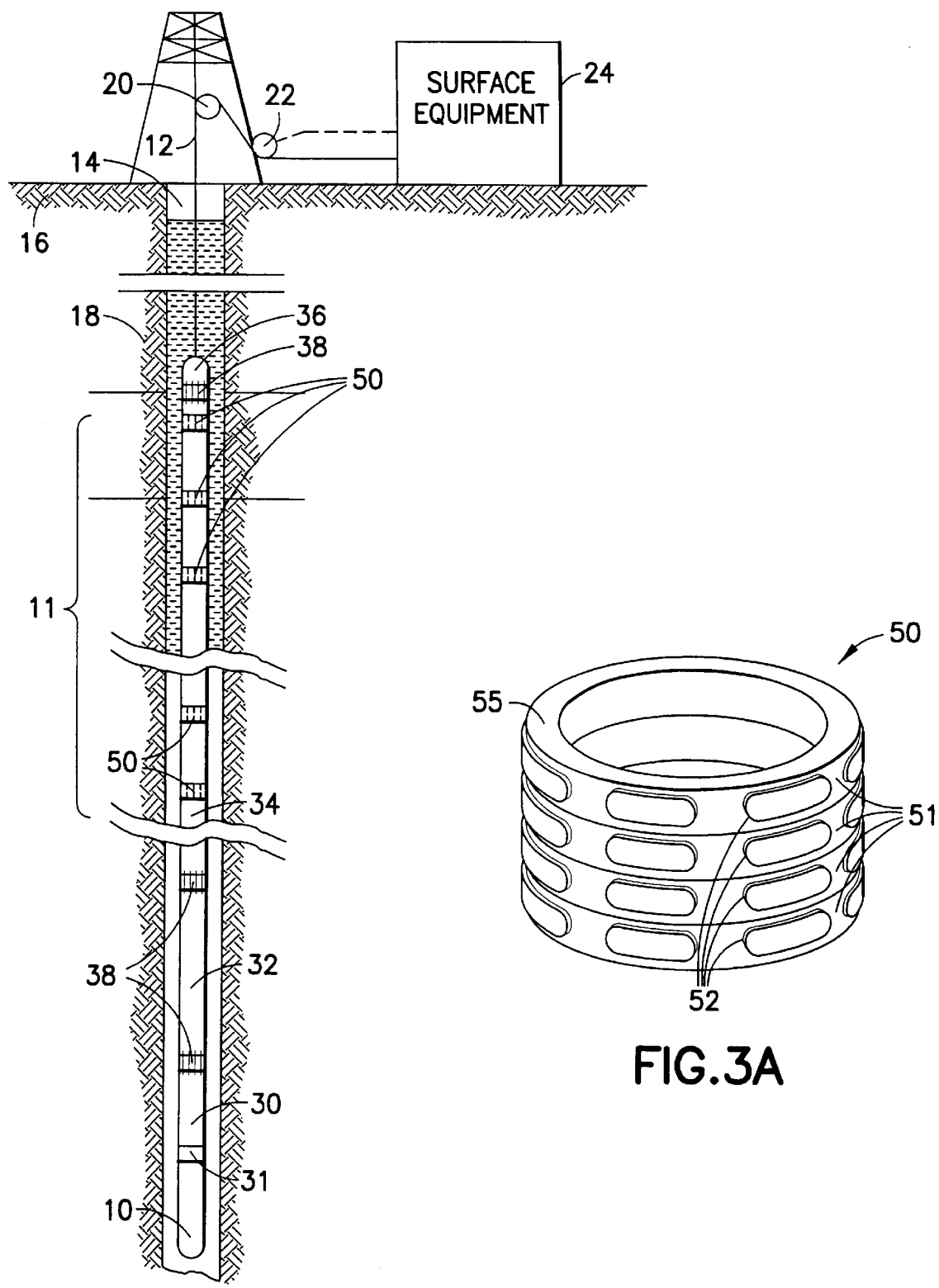
FIG. 3 is a schematic diagram of a borehole logging system, showing an elongated sonde with its axial array of receiver stations, including an enlarged view of one of the stacked-ring arrays, in accordance with the first preferred embodiment of the invention.
Figure 4A:
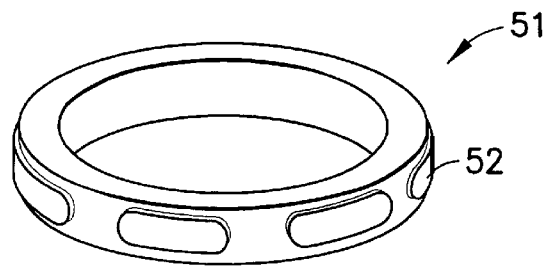
FIG. 4A is a perspective view of one ring array of the stacked ring array shown in FIG. 3.
Figure 4B:
FIG. 4B is an unwrapped view of the ring array of FIG. 4A.

In the first preferred embodiment of a borehole logging system for wireline logging, illustrated schematically in FIG. 3, the system includes an elongated logging tool or sonde 10. Sonde 10 includes a receiver array consisting of an axial array 11 of twelve receiver stations 50, each receiver station 50 in the form of a stacked-ring azimuthal array. FIG. 3 includes an enlarged view of one of the stacked-ring arrays. In the first preferred embodiment, each stacked-ring array includes a stack of four ring arrays 51. Each ring array 51 includes eight matched acoustic receiver elements 52 in the form of piezoelectric buttons equally spaced apart azimuthally around a relatively acoustically inert ring-like carrier 55. FIG. 4A is a perspective view of one ring array. FIG. 4B is an unwrapped view of the ring array of FIG. 4A.

Figure 5:
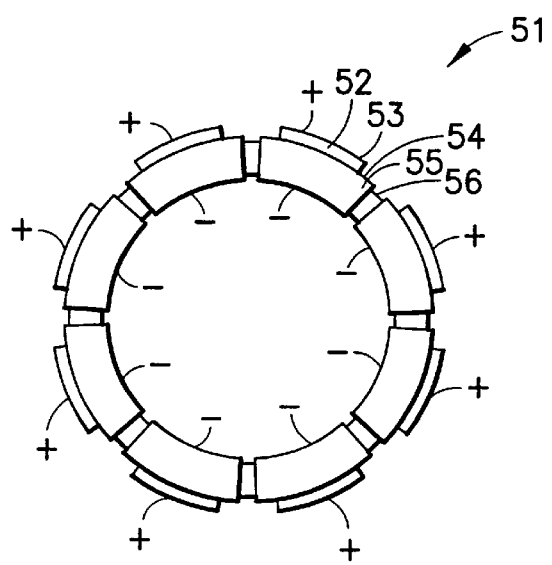
FIG. 5 shows the structure of one ring array of one of the receiver stations shown in FIG. 3 and provides a schematic diagram of output electrical charge pattern.

FIG. 5 shows the structure of one ring array and provides a schematic diagram of output electrical charge pattern. Each piezoelectric button of each ring array 51 is poled along its thickness axis, i.e., transverse to its faces, so as to provide outputs as shown in FIG. 5. Each ring array 51 includes acoustic receiver element (button) 52 mounted to carrier 55. Carrier 55 includes an electrically conductive surface 54 that is in electrical contact with the inner surface of element 52. Surface 54 of the stacked rings are in contact with each other, providing parallel connection between the inner surface of each of the four elements that are in the same azimuthal orientation. The outer surface 53 of each of the four elements that are in the same azimuthal orientation are connected by an external connection (not shown). Electrical output is taken between a first terminal coupled to the external connection and a second terminal coupled to conductive surface 54. Electrical isolation between elements is maintained by insulating gap 56 in conductive surface 54. Thus, the four buttons having the same azimuthal orientation in the stacked-ring array are stacked mechanically in series as shown in FIG. 3, but are connected electrically in parallel to improve sensitivity. Preferably, the piezoelectric ceramic used to make the buttons is lead titanate. The use of lead titanate results in a lower coupling of interfering axial vibrations to radial pressure sensitivity. Radial vibrations in a radially aligned piezoelectric sensor produce a signal output voltage representing the radial vibrations. Ideally, axial vibrations in the same radially aligned piezoelectric sensor produce no voltage. However, axial vibrations do produce a low level of spurious radial pressure signal output. The use of lead titanate reduces this unwanted effect.

Figure 6A:
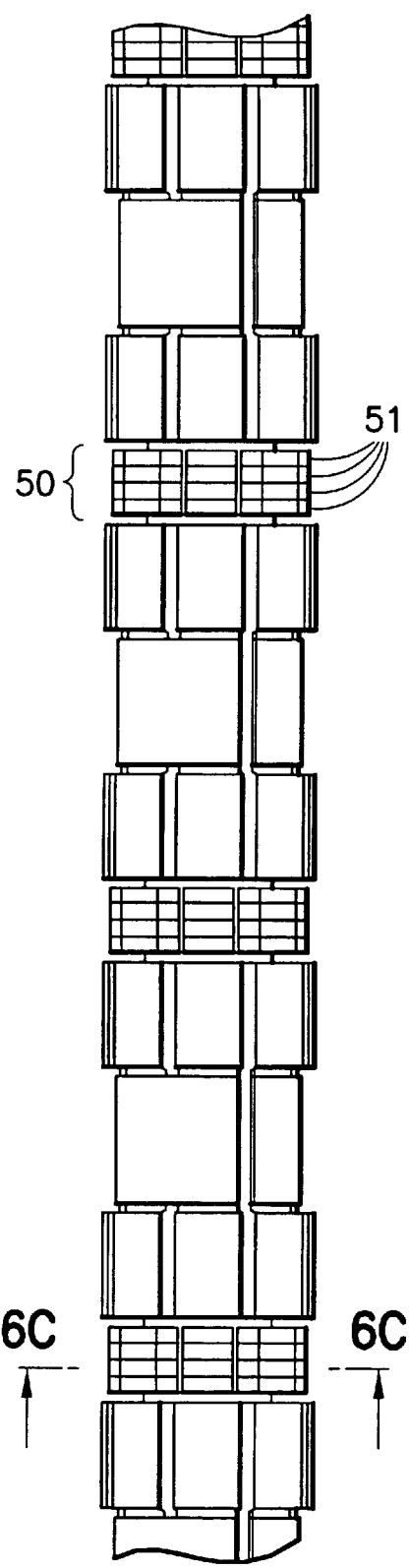
FIG. 6A is a side view of the axial array of receiver stations shown in FIG. 3.
Figure 6B:
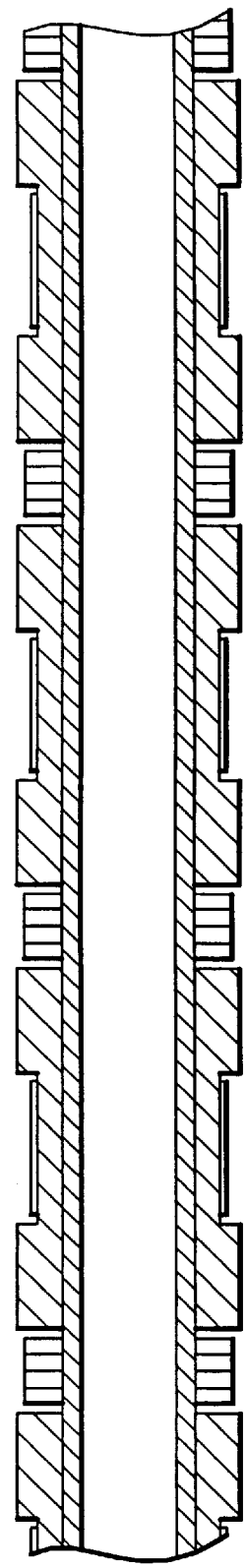
FIG. 6B is a cross section view of the axial array of receiver stations shown in FIG. 1.
Figure 6C:
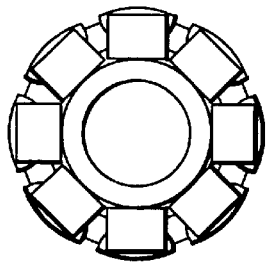
FIG. 6C is a cross section view of one ring array at A—A of FIG. 6A.

FIGS. 6A and 6B show an elevation view and a cross-section side, respectively, of a portion of the axial array. FIG. 4C is a cross-section view, across A—A of FIG. 4A, of a single ring array 51 of the first preferred embodiment.

Figure 7:
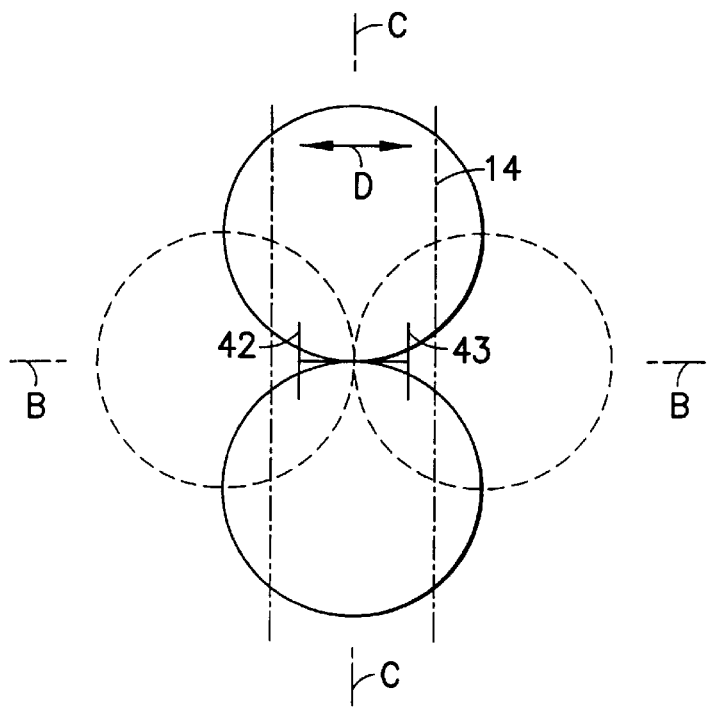
FIG. 7 (prior art) is a schematic diagram of the radiation pattern from the single pair of dipole elements of the transmitter of the embodiment of FIG. 3.
Figure 8:
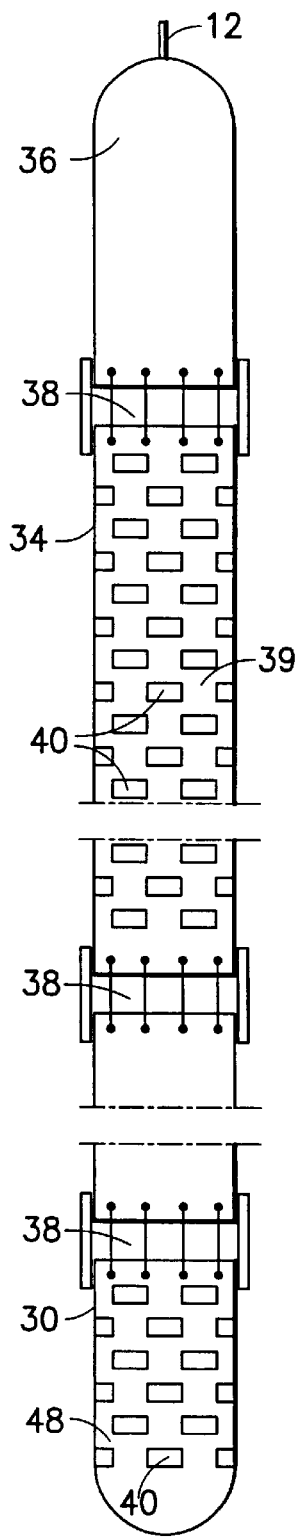
FIG. 8 (prior art) shows slots in the wall of the acoustic source section of the sonde and in the wall of the acoustic receiver section of the sonde.

Transmitter 31 in FIG. 3 is a dipole transmitter defining an inline plane and a cross line plane within the borehole. FIG. 7 (prior art) shows two plates 42 and 43 of a dipole transmitter defining an inline plane B—B and a cross line plane C—C within borehole 14, the plates vibrating in directions shown in arrow D. FIG. 8 (prior art) shows the casing of the sonde in greater detail. Source section 30 has a sleeve 48 closed at one end made of steel pipe perforated by numerous slots as at 40. This section contains an acoustic source for propagating radiation through the borehole liquid to the formation. Receiver section 34 is also made of steel pipe perforated by numerous slots as at 40. This section contains an acoustic receiver array for receiving acoustic radiation propagated back through the borehole liquid from the formation.

As illustrated in FIG. 3, sonde 10 in use is suspended on armored communication cable 12 in borehole 14 penetrating earth formation 16. Borehole 14 is filled with liquid 18, such as drilling mud, used to stabilize the borehole wall and prevent escape of formation fluids up the borehole. Sonde 10 is moved in borehole 14 by paying out cable 12 and reeling it back in over sheave wheel 20 and depth gauge 22 by means of a winch forming part of surface equipment 24. Logging measurements are usually made while a sonde is being raised back up the borehole, although in certain circumstances they can be additionally or alternatively made on the way down. Depth gauge 22 measures displacement of cable 12 over sheave wheel 20 and thus the depth of sonde 10 in borehole 14.

Sonde 10 includes an acoustic source section 30 at the bottom, a spacer section 32 separating this source section from an acoustic receiver section 34, and a coupling section 36 above the receiver section and attached to cable 12. Sections 30 through 36 are coupled mechanically to each adjacent section by acoustic isolation joints 38. Source section 30 generates acoustic radiation that propagates through liquid 18 then into and up the formation 16. Some of the acoustic radiation propagates back through the liquid 18 to the receiver section 34 which generates digitized signals representative of successive samples of the waveform of the received radiation. These signals are suitably conditioned by processing and interface circuitry in sonde 10 for transmission up cable 12 and into surface equipment 24. Equipment 24 typically receives, decodes, amplifies, and records the signals on chart, magnetic tape recorders, and/or more typically, computer disk, as a function of the depth. Depth signals are generated by depth gauge 22. In addition, equipment 24 can process the data represented by these signals to yield indications of the required formation parameters that are also recorded. Further processing of these and other signals from sonde 10, enables surface equipment 24 to monitor the operation of sonde 10 and generate signals which are transmitted down cable 12 to control sonde 10. This can be, for example, to synchronize the operation of its component circuits or modify circuit parameters such as amplifier gain.

FIG. 3 shows five of the twelve receiver stations 50 of axial array 11. The axial array can include eight to sixteen receiver stations. In the preferred embodiment, the twelve receiver stations (stacked-ring arrays) of axial array 11 are spaced uniformly six inches apart. However, it is not required that the stacked-ring arrays of the axial array of the present invention be uniformly spaced apart. Early processing algorithms assumed a uniform axial spacing of receiver stations. These processing algorithms can be easily modified to include the case of non-uniform spaced axial arrays of receiver stations. These algorithms are known to people skilled in the art and can be used with embodiments of the present invention in which the receiver stations are non-uniformly spaced axially.

FIG. 3 shows the preferred embodiment includes eight receiver elements 52. However, in other embodiments the number of receiver elements could conveniently be any number between four and sixteen. It is highly desirable that the receiver elements of each ring receiver be uniformly spaced azimuthally, well centered in the borehole, and closely matched with each other. In general, the receiver elements in an azimuthal ring array need to be more closely matched to each other than to the receiver elements in the other receiver stations in the axial array. In the preferred embodiment, the azimuthal array receiver elements are matched within 0.3 dB in amplitude and 0.8 degrees in phase of each other over the frequency range of interest.

In the preferred embodiment, each receiver element in each receiver station has an associated amplifier section, the output of which is coupled to the analog input of an analog-to-digital (A-D) converter. Sample-and-hold multiplexer circuitry is used to reduce the number of A-D converters required. A separate digital output signal is produced for each receiver element of the receiver array. The digital outputs of each of the A-D converters associated with the receivers can be compressed and directly sent uphole and recorded to disk or tape for later post-processing.

In an alternative version, the digital outputs from the A-D converters are pre-processed downhole using Digital Signal Processor (DSP) chips, one DSP chip processing the digital outputs from each receiver station.

The A-D converter preferably has a resolution of at least 16 bits. This converter includes a sample-and-hold circuit and an oscillator which generates timing pulses to coordinate sampling and digitizing of the magnitude of the signal from the amplifier at regular intervals, for example with a repetition rate of 100 kHz. The A-D converter has a reset input R connected to the trigger signal line to re-synchronize the oscillator in the converter each time the source is triggered. In particular, the digitized output signals of each A-D converter are sent uphole via the circuitry in the section and the cable to the surface equipment for recording and analysis as required. A typical amplifier section is preferably configured as a charge amplifier if it is located away from the immediate vicinity of the piezoelectric receivers. If the amplifier section is located close to its associated piezoelectric receivers, then the amplifier section can be configured as a voltage amplifier. Circuit components such as amplifiers, A-D converters, sample-and-hold chips, and multiplexers, as well as software for compressing digital signals prior to sending them uphole, are used herein as known in the prior art, in like manner to that disclosed in U.S. Pat. No. 4,951,267 (the Chang patent).

The interval between successive trigger signals, and thus the interval between successive pulses, is arranged to allow recording of waveforms from the receivers of sufficient duration to include all components of interest before arrival of energy resulting from the next firing of the source. This interval will therefore depend on the velocity of acoustic energy propagating through the formation, and can be fixed in advance in anticipation of expected shear velocity values for the formation to be investigated or adjusted during logging in accordance with actual measured values. The repetition rate of the trigger signals will also depend on the rate at which the sonde is drawn up the borehole and the desired distance between formation points at which measurements are to be made. Thus, for a measurement spacing of six inches at a logging speed of 1800 feet per hour, one trigger pulse per second suffices. A typical maximum trigger pulse rate is 15 pulses per second. Preferably, receiver stations are equally spaced, and the measurement spacing equals the spacing between receiver stations. Having successive pairs of trigger pulses occur after the sonde has moved a distance equal to the receiver spacing, allows the use of analytical techniques which take advantage of the multiple redundant measurements obtained with an array of receivers. The A-D converter is free-running, so it typically digitizes many samples between measurement trigger signals that are not required. These surplus measurements need not be recorded. However, the measurements occurring after a trigger signal but before acoustic energy reaches the receivers are recorded in the preferred embodiment. This permits the initial part of the digitized signal, before arrival of acoustic energy of the receivers, to be used in establishing a zero level for analysis of subsequent parts of the digitized signal.

In an alternative embodiment, the digital outputs of the A-D converters associated with each receiver station are pre-processed downhole using Digital Signal Processor (DSP) chips downhole. In this embodiment, one or two DSP chips are used, and the digital outputs are compressed and directly sent uphole and recorded to disk or tape for later post-processing.

Full-Coverage Ring Receiver Stations for Wireline Logging

Figure 9A:
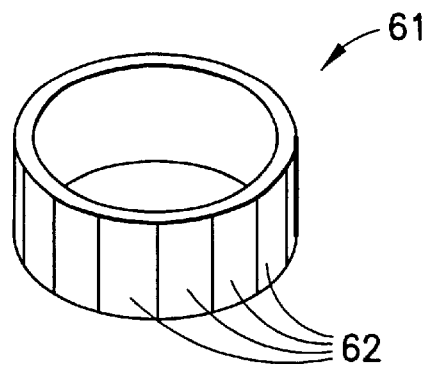
FIG. 9A is a perspective view of a ring array of receiver elements, in accordance with a second version of the embodiment of FIG. 3.
Figure 9B:
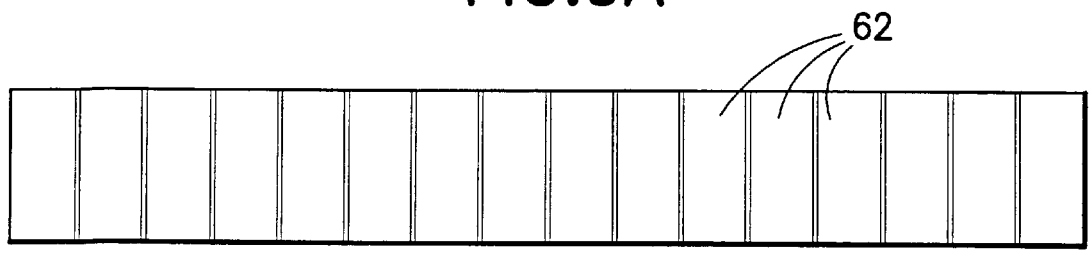
FIG. 9B is an unwrapped view of the ring array of FIG. 9A.

In a variant on the first preferred embodiment, multiple "full-coverage" ring receiver elements are used, made from a radially polarized piezoelectric ceramic ring. As illustrated in FIGS. 9A and 9B, ring array 61 includes a piezoelectric ring that is machined to produce matched, electrically separate, but mechanically contiguous, rectangular receiver elements 62. The ceramic ring is made of radially polarized lead titanate piezoelectric ceramic. The inner and outer surfaces of each ring are coated with a thin conductive coat of silver or gold film, a few hundred nanometers thick, to form separate inner and outer electrodes. The inner electrodes serve as ground electrodes. A laser, or a numerically controlled milling machine, is used to lightly scroll away thin vertical lines of electrode from the outer surface of each ring. Enough vertical lines are scrolled to form the number of matched, equally-spaced receiver elements that are desired. This variant preferably uses sixteen receiver elements.

Apodized Receiver Stations for Wireline Logging

Figure 10A:
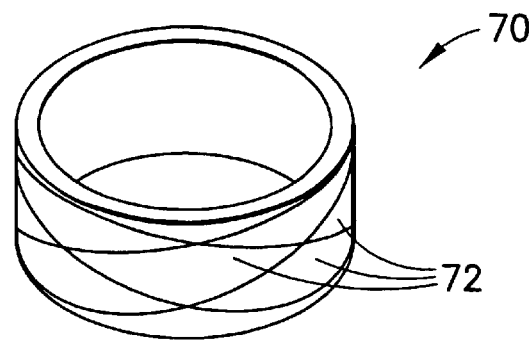
FIG. 10A is a perspective view of a dipole ring array of apodized receiver elements, in accordance with the second preferred embodiment of the present invention.
Figure 10B:
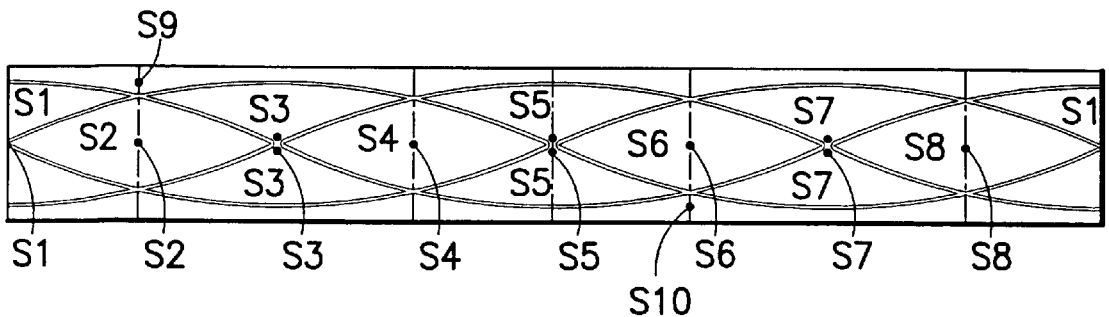
FIG. 10B is an unwrapped view of the dipole ring array of FIG. 10A.

In a second preferred embodiment, each apodized receiver station 70 includes a plurality of apodized receiver segments 72, as illustrated in FIGS. 10A and 10B for the dipole case. A piezoelectric ring is machined to produce matched, electrically separate, but mechanically contiguous, receiver segments 72. The piezoelectric ring is made of radially polarized lead titanate piezoelectric ceramic. The inner and outer surfaces of each ring are coated with a thin conductive coating of silver or gold film, a few hundred nm thick, to form separate inner and outer electrodes. The inner electrodes serve as ground electrodes. In this embodiment a laser, or a numerically controlled milling machine, is used to lightly scroll away thin vertical lines of electrode from the outer surface of each ring. Enough vertical lines are scrolled to form receiver segments 72 as shown in FIGS. 10A and 10B.

Apodized receiver segments 72 are shown in FIG. 10B as S1–S8. (Edge portions S9 and S10 are not used). Each apodized receiver element is formed by connecting electrically in series (voltage summing) the outputs of three segments. Four receiver elements are formed in this way.

Figure 11A:
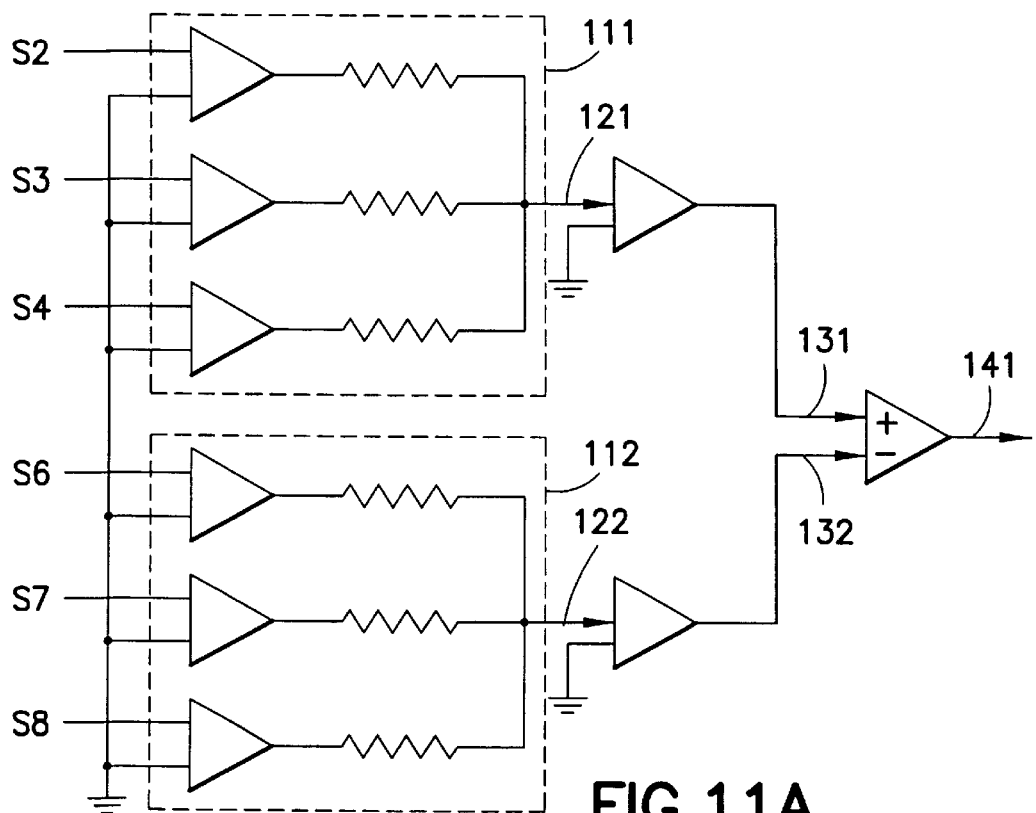
FIG. 11A is a schematic electronic circuit for producing the inline output of the dipole apodized receiver station.

FIG. 11A is a schematic electronic circuit for producing the inline output of the apodized receiver station. Details of the circuit components shown are not described herein because the y are well known to those skilled in the art.

Figure 11B:
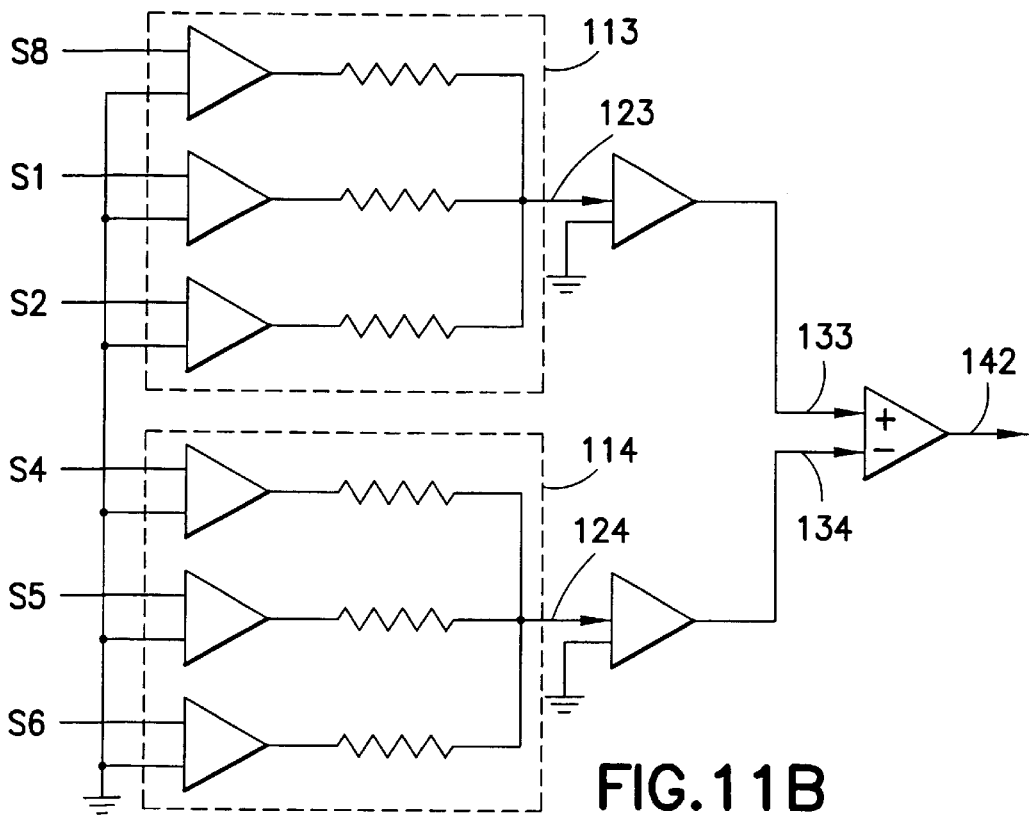
FIG. 11B is a schematic electronic circuit for producing the crossline output of the dipole apodized receiver station.

Referring to FIGS. 10B and 10A, a first receiver element 111 sums the analog outputs from sections S2–S4 to produce first receiver element output signal 121, with a voltage of (S2+S3+S4), as shown in FIG. 11A. A second receiver element 112 has an output signal 122, with a voltage of (S6+S7+S8). A third receiver element 113 has an output signal 123, with a voltage of (S8+S1+S2), as shown in FIG. 11B. A fourth receiver element 114 has an output signal 124, with a voltage of (S4+S5+S6).

The voltage outputs of first and second receiver elements 131 and 134 are differenced to produce an inline voltage: (S2+S3+S4)–(S6+S7+S8) at inline output 141. The voltage outputs of third and fourth receiver elements 133 and 132 are differenced to produce a crossline voltage (S8+S1+S2)–(S4+S5+S6) at cross line output 142.

The two electrically separate receiver elements are structured to have a pressure sensitivity response that varies in the azimuthal direction so as to apply cosine transform filtering in the process of generating the receiver (analog) output signals. This requires that the pressure sensitivity of each azimuthal receiver array vary in the form of a single sinusoid or multiple sinusoids azimuthally around the array. For dipole selection, each receiver element is shaped according to the first 180 degrees of a single sinusoidal shape. For quadrupole selection, each receiver element is shaped according to the first 90 degrees of a double sinusoidal shape. For sextupole selection, each receiver element is shaped according to the first 60 degrees of a triple sinusoidal shape. The sinusoids are oriented such that their sensitivity maxima are aligned inline with the orientation of the multipole source. The shape of the electrodes on each receiver can be physically tailored to achieve this apodization.

As shown in FIG. 11A, analog outputs from sections S2, S3, and S4 of the ring in FIG. 10B are summed to produce analog receiver element output 121 associated with a first receiver element. The signals are all measured with respect to ground potential. The analog outputs from sections S6, S7, and S8 are summed to produce an analog receiver element output 122 associated with the second receiver element. Buffered outputs 131 and 132, corresponding to outputs 121 and 122, are differenced to produce the inline output 141 of the apodized receiver station. This assumes that these receivers are aligned inline with the orientation of a dipole transmitter.

As shown in FIG. 11B, the analog outputs from sections S8, S1, and S2 are summed to produce analog receiver element output 123 associated with the third receiver element. The analog outputs from sections S4, S5, and S6 are summed to produce receiver element output 124 associated with the fourth receiver element. Buffered outputs 133 and 134, corresponding to outputs 123 and 124, are differenced to produce the crossline output 142 of the apodized receiver station.

In the second preferred embodiment of the apparatus, because only two receiver elements are associated with each apodized receiver station, the analog inline and crossline outputs (141 and 142) of each apodized receiver station can be pre-processed downhole without using Digital Signal Processor (DSP) chips. Thus, the inline receiver element outputs can also be electrically or electronically differenced downhole to produce the analog dipole output from the inline array. Similarly, the crossline receiver element outputs can also be electrically or electronically differenced downhole to produce the analog dipole output from the crossline array. In this case, the inline and crossline receiver array outputs are coupled to the analog inputs of analog-to-digital (A-D) converters, possibly aided by using multiplexers. The digital outputs of each of the A-D converters associated with the azimuthal receiver arrays can be then compressed and directly sent uphole and recorded to disk or tape for later post-processing.

Apparatus for Logging While Drilling (LWD)

In logging while drilling (LWD) applications, an elongated LWD acoustic logging tool is attached to a thick steel mandrill and placed behind the drilling equipment, and logging is performed as the borehole is being drilled.

Method for Wireline Logging using Stacked-Ring Array Receiver Stations

Figure 1:
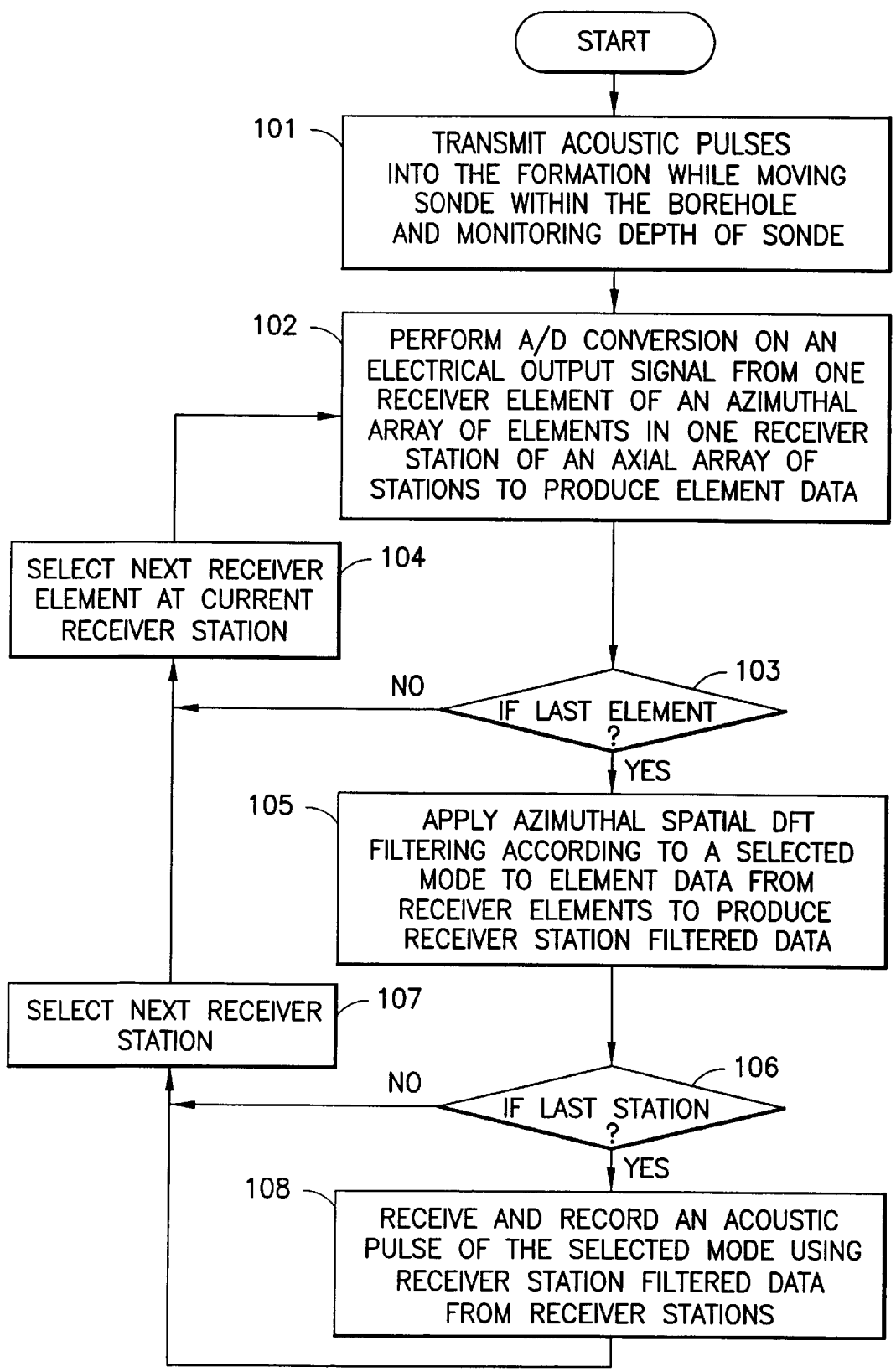
FIG. 1 is a flowchart illustrating the method of a first preferred embodiment of the invention that uses DFT filtering.

The first preferred embodiment of a borehole logging system for wireline logging is illustrated in FIG. 1 (method) and in FIGS. 3–8 (apparatus).

Figure 2:
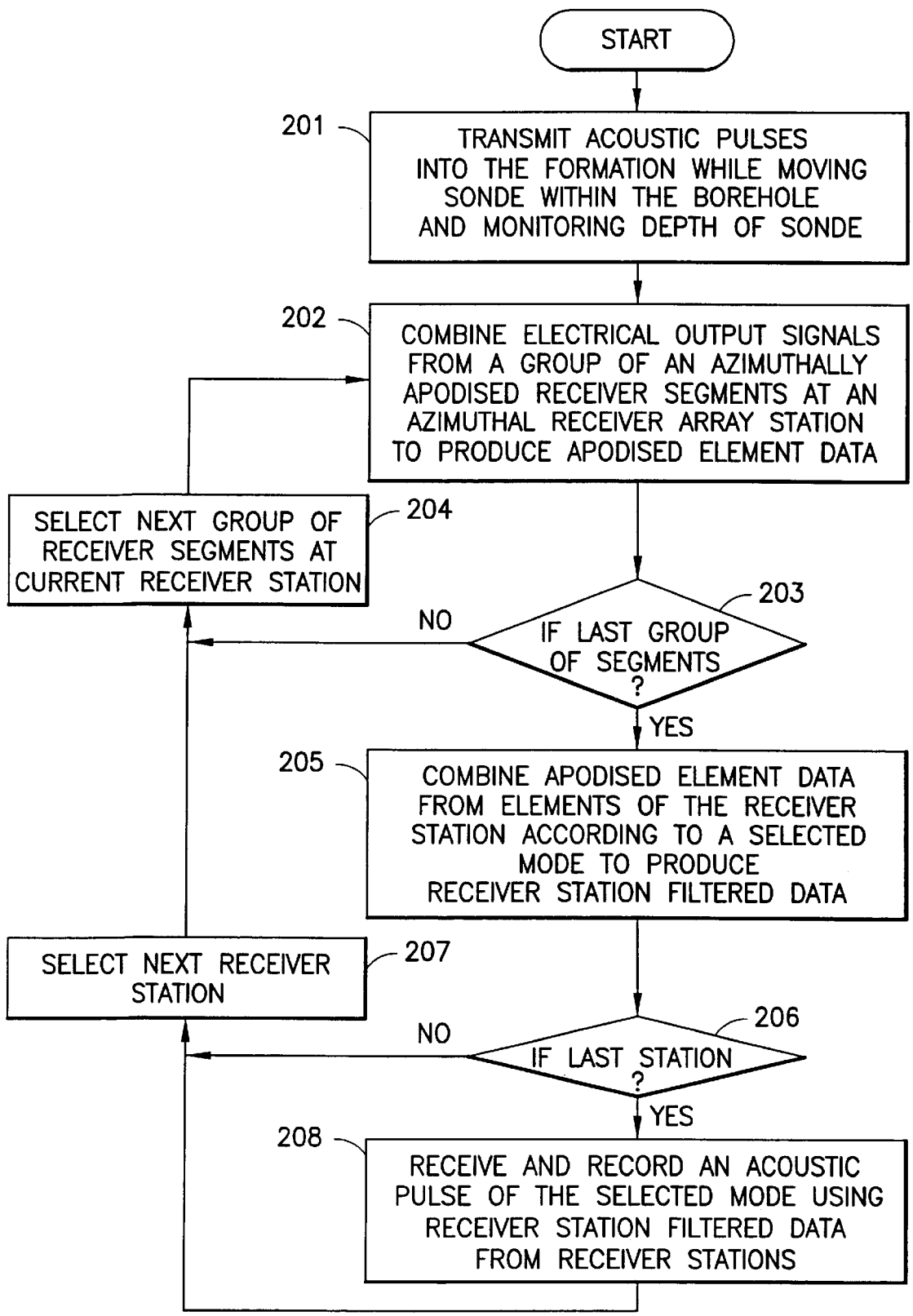
FIG. 2 is a flowchart illustrating the method of a second preferred embodiment of the invention that uses apodized receiver elements.

The second preferred embodiment of a borehole logging system for wireline logging is illustrated in FIG. 2 (method) and in FIGS. 3, 9A and 9B (apparatus).

The theory of operation, covering both embodiments, is given as follows.

Theory of Operation

We define the spectrum of the voltage output from the m'th azimuthally based ring receiver segment at the l'th radian frequency, $\omega_l$ to be $\overline{V}_{\omega\theta}(l, m)$, where m=1, ..., M, and where, for sampling interval $\Delta t$, the l'th radian frequency is defined as $$\omega_l \equiv 2\pi\left(\frac{l}{L(\Delta t)}\right), \text{ for } l = 0, \ldots, L-1.$$

We also define $\overline{H}_\omega(l)$ to be the array's rms average pressure sensitivity, and $\overline{\Delta}_{\omega\theta m}(l, \theta, m)$ to be the normalized receiver pressure sensitivity for the m'th receiver at azimuthal location $\theta$ (radian frequency). We assume that $\overline{P}_{\omega k}(l, k_0)$ and $\phi_0(l, k_0)$ are, respectively, the complex amplitude and azimuthal orientation of the $k_0$'th multipole, and that $\overline{N}_{\omega\theta}(l, \theta)$ is the noise spectrum at azimuthal location $\theta$, at radian frequency, $\omega_l$. The $k_0$'s are the azimuthal wavenumbers associated with the azimuthal multipoles in the pressure field. The noise field includes all unwanted, deterministic, and/or stochastic pressure field components such as borehole "road noise". Using these definitions, a general expression for the spatial Discrete Fourier Transform (DFT) of the voltage output spectrum of the azimuthal receiver array elements was derived. This expression, which will be used to analyze the multipole selectivity of various azimuthal array designs, is:

$$\overline{V}_{\omega\theta}(l,k) = \pi \overline{H}_\omega(l) \left\{ \sum_{k_0=0}^{K_0} [\overline{A}_{\omega k_s k}(l, k_0, k) e^{-jk_0 \varphi_0(l,k_0)} + \overline{A}_{\omega k_s k}(l, N-k_0, k) e^{jk_0 \varphi_0(l,k_0)}] \overline{P}_{\omega k}(l, k_0) \right. \qquad (1.1)$$
$$\left. + \sum_{k_1=0}^{K_1} [\overline{A}_{\omega k_s k}(l, k_1, k) e^{-jk_1 \varphi_1(l,k_1)} + \overline{A}_{\omega k_s k}(l, N-k_1, k) e^{jk_1 \varphi_1(l,k_1)}] \overline{N}_{\omega k}(l, k_1) \right\}.$$

where the M-point spatial Discrete Fourier Transform of the spatial spectral components of the normalized receiver pressure sensitivity (M is the number of receivers) is defined as $\overline{A}_{\omega k_s k}(l, k', k)$ $$\overline{A}_{\omega k_s k}(l, k', k) \equiv D\mathfrak{J}_M_{m \to k} \{\overline{A}_{\omega k_s m}(l, k', m)\}, \text{ and} \qquad (1.2)$$

$$\overline{A}_{\omega k_s m}(l, k', m) = \frac{1}{2\pi} \int_0^{2\pi^-} \overline{A}_{\omega\theta m}(l, \theta, m) e^{jk'\theta} d\theta \qquad (1.3)$$
$$= \mathfrak{J}_N^{-1}_{\theta \to k'} \{\overline{A}_{\omega\theta m}(l, \theta, m)\}, \text{ the inverse Finite FT}$$
i.e., $\overline{A}_{\omega\theta m}(l, \theta, m)$
$\equiv 0$ outside the interval $(0 \le \theta < 2\pi)$
$$= \lim_{N \to \infty} \left\{ D\mathfrak{J}_N^{-1}_{n \to k'} \left\{ \overline{A}_{\omega\theta m}\left(l, \frac{2\pi n}{N}, m\right) \right\} \right\}.$$

and N, defined by the usage in equation 1.3, is the number of equi-spaced points used in the azimuthal discretization of the normalized receiver pressure sensitivity.

Equation 1.1 is an expression for the spatial Discrete Fourier Transform of the receiver voltage output spectrum. It gives the spectral output at frequency $\omega_1$, that would be obtained in the k'th Fourier Transform (DFT) "bin" after spatially Fourier Transforming the voltage outputs of the azimuthal receiver array. Note that $k_0=0$ for monopole pressure fields, $k_0=1$ for dipole pressure fields, $k_0=2$ for quadrupole pressure fields, $k_0=3$ for sextupole pressure fields, etc. For the zeroth DFT bin (k=0), this spatial DFT corresponds to summing the outputs of all the receivers. For the "first" DFT bin (k=1), for a 2-receiver azimuthal array only, this spatial DFT corresponds to differencing the outputs of the two receivers. Thus, equation 1.1 is a generalization, for multi-receiver azimuthal arrays of the receiver summing and differencing operations used in the 2-receiver case to isolate the "monopole" and "dipole" parts of the borehole pressure field. It allows for the possibility that each receiver element can be of finite size and/or have pressure sensitivities that are apodized (shaped) in the azimuthal direction. The two types of dipole receivers described in the Prior Art section, can be regarded as special cases of a more generalized dipole receiver array design. Equation 1.1 allows us to characterize the performance of the two array embodiments being proposed in this patent. It also allows us to compare their performance to that of a typical "prior art" receiver and to each other's performance.

Equation 1.2 defines a function ($\overline{A}_{\omega k_s k}(l, k_0, k)$) which will be called the azimuthal mode response function. We call the reference direction, that we assume to be zero degrees when setting up the spatial DFT, the spatial DFT direction. Thus, $\phi_0(l, k_0)$ is the angular orientation, with respect to the spatial DFT direction, of the signal's $k_0$'th azimuthal multipole mode (at frequency $\omega_1$). Similarly, $\phi_1(l, k_1)$ is the angular orientation, with respect to the spatial DFT direction, of the energy associated with the $k_1$'th azimuthal noise wavenumber. We assume that the receiver outputs result from a pressure environment where there is no "significant" signal energy beyond the $K_0$'th azimuthal multipole and no "significant" noise energy beyond the $K_1$'th "noise" multipole. There is, however, no restriction on the size of $K_0$ or $K_1$. Also, we refer to the noise amplitude associated with each of the pressure field's azimuthal noise wavenumbers as the external noise's wavenumber spectra.

It is obvious from equation 1.1, that the k'th bin of the spatial Discrete Fourier Transform of the receiver voltage output spectrum, $\overline{V}_{\omega k}(l, k)$, can pick up contributions from a variety of azimuthal modes and from energy associated with various noise wavenumbers. The extent of the contributions depends on the shape of $\overline{A}_{\omega k_s k}(l, k_0, k)$, the spatial Discrete Fourier Transform of the normalized receiver pressure sensitivity. The location and sensitivity "shape" of the elements of the azimuthal array purely determines this shape. Thus, $\overline{A}_{\omega k_s k}(l, k_0, k)$ can be viewed as an azimuthal mode filter function. Variation in shape can be interpreted in terms of the array responding to or selecting certain azimuthal modes and rejecting others. For each of the array's spatial DFT bins, the modal contribution to it is given by the product of the value of the azimuthal mode response function and projections of the mode's amplitude in the spatial DFT direction. Thus, additionally, each of the array's spatial DFT bins, will get noise contributions given by the product of the value of the azimuthal mode response function and projections, in the spatial DFT direction, of the external noise's wavenumber spectra. Depending on the shape of external noise's wavenumber spectra, some array designs would also have better noise rejection characteristics than others. Thus, an array's azimuthal mode response function can give critical information about its mode selection and noise rejection performance.

Consider the case of equally spaced, perfectly-matched receivers that are perfectly-centered in a borehole which has an acoustic pressure field consisting only of monopole and dipole components. This is an ideal case. In practice, receivers are not perfectly matched. This fact must be accounted for in the design of receiver arrays. However, this is a good starting point for discussion. In the 2-receiver case, where M=2, bin 0 of the array response function has peaks at wavenumbers 0, 2, 4, 6, 8, etc. Bin 1, on the other hand has peaks at wavenumbers 1, 3, 5, 7, 9, etc. Thus, the output in bin 0, which is obtained by summing the receiver outputs, contains monopole components, in addition to aliased quadrupole, octapole, and higher even wavenumber components from the pressure field. The other components of the field are perfectly rejected. The output in bin 1 for the 2-receiver case is obtained by simply differencing the receiver outputs and contains dipole as well as aliased sextupole, decupole, and higher odd wavenumber components from the pressure field. As before, the other components of the field are perfectly rejected. In general, all 2-port dipole receivers (including benders) tend to have similar aliasing behavior.

From this general standpoint, the summing and differencing operations on the receiver outputs used in the prior art to separate the monopole and dipole parts of the pressure field are equivalent to performing a 2-receiver spatial (azimuthal) Fourier Transform (DFT) on the receiver outputs. Continuing the assumption of perfectly matched receivers, we can also assume a borehole pressure field that only consists of monopole and dipole components. As a result, summing the outputs of pairs of receivers that are 180 degrees apart from each other, gives the monopole (typically Stoneley, compressional, and shear) part of the field, and differencing their outputs gives the dipole (typically flexural) part of the field.

Notice, however, that (for either bin) the filtering effect from using two equally spaced point receivers does not attenuate the higher order aliased components of the pressure field. Thus, for this 2-receiver case, summing the receiver outputs results in an output which contains the monopole part and any aliased contributions from the quadrupole, octapole, etc., parts of the pressure field. Similarly, for the 2-receiver case, differencing the outputs of the two oppositely placed receivers measures the dipole part and any aliased contributions from the sextupole, decupole, etc., parts of the pressure field. Thus, if these components are significantly present in the pressure field, they will similarly be present in the summed (bin 0) or differenced (bin 1) receiver outputs. In some cases, this can result in a received pressure field that is significantly contaminated. This problem is addressed by the disclosed embodiments of the present invention.

We now consider the case of equally spaced, perfectly matched, point receiver arrays consisting of four receivers. Bin 0 of the array response function now has peaks at wavenumbers 0, 4, 8, 12, 16, etc. Bin 1 has peaks at wavenumbers 1, 5, 9, 13, 17, etc. Bin 2 has peaks at wavenumbers 2, 6, 10, 14, 18, etc. Bin 3 has peaks at wavenumbers 3, 7, 11, 15, 19, etc. Thus, the output in bin 0, which is obtained by summing the receiver outputs, selects the monopole components of the pressure field in addition to higher order components corresponding to wavenumbers 4, 8, 12, etc. The other components of the field are perfectly rejected. The output in bin 1 selects the dipole components of the pressure field in addition to higher order components corresponding to wavenumbers 5, 9, 13, etc. The other components of the field are perfectly rejected. As before, the filtering effect from using four equally spaced point receivers, does not attenuate the higher order aliased components of the pressure field.

This idea can be generalized to the case when M perfectly-matched, equally spaced, and perfectly centered receivers are used to measure the acoustic pressure at each axial location (for integer M>1). In general, bin 0 of the M-bin spatial Fourier Transform (DFT) contains the monopole part and aliased higher order multipole pressure field contributions and bin 1 contains the dipole and aliased higher order multipole pressure field contributions. In practice, the frequency ranges used in sonic logging are designed to excite the lowest order azimuthal borehole modes. The greater the number of receivers used in the array (M), the higher the order of the potential alias contributions received. Often, the higher the azimuthal order of the borehole modes, the less they are excited in the borehole by imperfect transmitters. Thus, a greater number of receivers used in the array (M), results in a smaller reception of aliasing contamination.

We now consider the case of perfectly matched apodized full coverage ring receivers where their pressure sensitivity vary in the form of a single sinusoid azimuthally around them. The sinusoid is assumed to be oriented such that the sensitivity maximum occurs at zero degrees. The shape of the electrodes on each receiver can be physically tailored to achieve this apodization. This apodization can also be achievable either electronically or digitally by imagining each full coverage receiver element as consisting of several smaller piezoelectric sections. The outputs of these sections can then be weighted and combined either electronically or digitally to approximate a single receiver array element output. There is a heterodyning effect on the azimuthal array modal response function. The wavenumber locations of the peaks in the azimuthal array response are shifted/split to form peaks at locations 1 wavenumber higher and 1 wavenumber lower. More strikingly, however, only dipole is selected in bin 0. There is no aliasing. This is the ultimate in selectivity. Thus, summation of the sinusoidally apodized receiver outputs selects only dipole energy. This is the same as differencing the outputs of mirror-image half-sinusoidally responding sections. In addition, only wavenumber 1 of the external noise wavenumber spectra is selected. This results in an extremely high signal (assumed to be dipole) to noise (both coherent and incoherent) selectivity ratio.

In general, a double sinusoidal apodization can be used to uniquely select quadrupole, a triple sinusoidal apodization can be used to uniquely select sextupole, etc.

Method of the First Preferred Embodiment (DFT)

FIG. 1 is a flowchart that illustrates the first preferred method of the invention. A more detailed description is provided in the instructions that follow for the dipole case.

Couple each of the analog outputs of the receiver elements of the first embodiment of the apparatus to the input channel of an A-D converter. Couple the A-D converters' digital outputs associated with an azimuthal array to a DSP chip downhole. Alternatively, compress these digital outputs and send them uphole to be recorded on tape or computer disk. Perform DFTs on the groups of digital outputs associated with each azimuthal array. This would be performed downhole using the DSP chips. This would be performed uphole in post-processing using one of the many computer programs for performing DFT computations.

Associate the DFT's first bin (bin 0) with monopole pressure variation (and any associated aliasing contributions), and the second bin (bin 1) with dipole pressure variation (and any associated aliasing contributions). The third bin (bin 2), if there are enough receivers in the azimuthal array for it to exist, would be associated with quadrupole pressure variation (and any associated aliasing contributions). The fourth bin (bin 3), if there are enough receivers in the azimuthal array for it to exist, would be associated with sextupole pressure variation (and any associated aliasing contributions).

Use enough receivers in the receiver array so that aliasing contributions can be assured of being negligible. In the preferred embodiment, eight receivers are used.

Method of the Second Preferred Embodiment (apodization)

FIG. 2 is a flowchart that illustrates the second preferred method of the invention. A more detailed description is provided in the instructions that follow.

Use electronic summing and multiplexing techniques to combine the analog outputs from the receiver sections S2, S3, and S4 of the ring in FIG. 10B to produce an analog output associated with the "positive" sinusoidally apodized inline receiver element. Use electronic summing and multiplexing techniques to combine the analog outputs from the receiver sections S6, S7, and S8 of the ring in FIG. 10B to produce an analog output associated with the "negative" sinusoidally apodized inline receiver element.

Similarly, use electronic summing and multiplexing techniques to combine the analog outputs from the receiver sections S8, S1, and S2 of the ring in FIG. 10B to produce an analog output associated with the "positive" sinusoidally apodized crossline receiver element. Use electronic summing and multiplexing techniques to combine the analog outputs from the receiver sections S4, S5, and S6 of the ring in FIG. 10B to produce an analog output associated with the "negative" sinusoidally apodized crossline receiver element.

Couple each of the analog outputs of the sinusoidally apodized receiver elements of the second preferred embodiment of the apparatus to the input channel of an A-D converter. The method keeps more information available for later processing and interpretation.

Alternatively, in this second embodiment, because only two or four receiver elements are associated with each azimuthal array, their analog outputs can be pre-processed downhole. This means that the inline receiver element outputs can be electrically or electronically differenced downhole to produce the analog dipole output from the inline array. It also means that the crossline receiver element outputs can be electrically or electronically differenced downhole to produce the analog dipole output from the crossline array. Couple the analog dipole outputs from each inline and the cross-line array to separate input channels of an A-D converter.

Compress the digital outputs of the A-D converters and send them uphole to be recorded on tape or computer disk.

Difference the digital outputs associated with the "positive" and "negative" receiver elements for the inline and the crossline array. This would preferably be performed uphole in post-processing using one of the many computer programs for performing these simple computations digitally.

Associate these differenced digital outputs (performed either downhole or uphole) with the dipole contributions in the borehole pressure field.

Quadrupole and Sextupole Modes

Methods equivalent to the second preferred embodiment are available for quadrupole and sextupole reception by using double and triple sinusoid apodization and performing steps similar to those described above.

What is claimed is:

1. A method for detecting a received acoustic pulse of a selected azimuthal borehole mode in a liquid-containing borehole in a formation, the method comprising:

a) providing a sonde having an axial array of acoustic receiver stations aligned with the borehole, each receiver station having an azimuthal array of at least four piezoelectric receiver elements, the receiver elements uniformly spaced apart around the azimuthal array;

b) transmitting an acoustic pulse into the formation to produce an electrical signal at each receiver element responsive to said transmitted acoustic pulse; and c) applying full sinusoidal azimuthal spatial filtering to a representation of the pulse after the pulse has passed through the formation to produce data representing a received acoustic pulse of the selected azimuthal borehole mode.

2. A method according to claim 1, wherein the number of the at least four piezoelectric receiver elements in a receiver station is at least equal to the minimum number of azimuthally arrayed receiver elements required to resolve pulses of the selected mode.

3. A method for detecting a received acoustic pulse of a selected azimuthal borehole mode in a liquid-containing borehole in a formation, the method comprising:

a) transmitting a stream of acoustic pulses from a sonde into the formation;

b) performing analog to digital conversion on an electrical signal from a receiver element of an azimuthal array of receiver elements, in a receiver station of an axial array of receiver stations, to produce element data representing the electrical signal;

c) repeating step b) for other receiver elements in the azimuthal array to produce element data for each of the other receiver elements;

d) applying full sinusoidal azimuthal spatial filtering, according to the selected mode, to element data of a receiver station to produce receiver station data;

e) repeating steps b) through d) for each receiver station of the axial array; and f) detecting a received acoustic pulse of the selected azimuthal borehole mode using receiver station data.

4. A method for detecting a received acoustic pulse of a selected azimuthal borehole mode in a liquid-containing borehole in a formation, the method comprising:

a) transmitting a stream of acoustic pulses from a sonde into the formation;

b) combining electrical signals from a first group of apodized receiver segments of an azimuthal array of receiver segments, the azimuthal array associated with one receiver station of an axial array of receiver stations, to produce apodized element data associated with the one receiver station;

c) repeating step b) for other groups of apodized receiver segments of the one receiver station to produce apodized element data for each of the elements of the one receiver station;

d) combining apodized element data, according to a selected mode, to produce an electrical signal representing a cosine transform of the acoustic pulse of the selected azimuthal borehole received by the one receiver station;

e) repeating steps b) through d) for each receiver station of the axial array to produce a set of receiver station electrical signals; and f) processing the set of receiver station electrical signals to produce data representing the received acoustic pulse of the selected azimuthal borehole mode.

5. A method according to claim 4, wherein combining includes differencing signals from pairs of apodized receiver elements.

6. An apparatus for detecting a received acoustic pulse of a selected azimuthal borehole mode in a liquid-containing borehole in a formation, the method comprising:

a) a sonde having an axial array of acoustic receiver stations aligned with the borehole, each receiver station having an azimuthal array of piezoelectric receiver elements;

b) a transmitter for transmitting an acoustic pulse into the formation; and c) a data processor;
wherein at least one of elements a), b) and c) includes means for applying full sinusoidal azimuthal discrete spatial transform filtering.

7. An apparatus according to claim 6, wherein each receiver station includes an azimuthal array of at least four piezoelectric receiver elements.

8. An apparatus according to claim 6, wherein the receiver elements are uniformly spaced apart around the azimuthal array.

9. An apparatus according to claim 6, wherein means for applying azimuthal spatial transform filtering includes software for performing azimuthal spatial DFT filtering.

10. An apparatus according to claim 6, wherein means for applying full sinusoidal azimuthal spatial transform filtering includes apodized receiver elements.

11. A method according to claim 1, wherein applying full sinusoidal azimuthal spatial filtering includes applying full sinusoidal azimuthal spatial DFT filtering.

12. A method according to claim 1, further comprising:

selecting a multi-pole mode for reduction of unwanted effects of aliasing; and using a number of azimuthally arrayed receiver elements that is greater than the minimum number required to resolve pulses of the selected mode without aliasing.

* * * * *